US012809552B2

(12) United States Patent
Roberts

(10) Patent No.: US 12,809,552 B2
(45) Date of Patent: Nov. 24, 2026

(54) GENERATING TOKENS USING NEAR-MEMORY COMPUTING

(71) Applicant: Micron Technology, Inc., Boise, ID (US)

(72) Inventor: David A. Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 137 days.

(21) Appl. No.: 18/784,199

(22) Filed: Jul. 25, 2024

(65) Prior Publication Data

US 2026/0029952 A1 Jan. 29, 2026

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

2024/0046037 A1* 2/2024 Jiao ........................ G06F 40/284
2025/0021842 A1* 1/2025 Bernstein ................. G06N 5/02
2025/0045523 A1* 2/2025 Tseng .................... G06F 40/284
2025/0307238 A1* 10/2025 Klein ................... G06N 3/0455
2025/0321995 A1* 10/2025 Jain ......................... G06F 40/30
2025/0363353 A1* 11/2025 Zhong ....................... G06N 3/08
2025/0377812 A1* 12/2025 Palaniappan ......... G06F 3/0625

OTHER PUBLICATIONS

Joao Gante, "Assisted Generation: a new direction toward low-latency text generation." https://huggingface.co/blog/assisted-generation, May 11, 2023, downloaded Jul. 24, 2024; 15 pages.

* cited by examiner

*Primary Examiner* — Hiep T Nguyen
(74) *Attorney, Agent, or Firm* — Harrity & Harrity, LLP

(57) ABSTRACT

In some implementations, a memory system may obtain, from a host system, a first command indicating a prompt associated with a large language model. The memory system may generate, based on the prompt, one or more first tokens using one or more first parameters, the one or more first parameters having a first fidelity and the one or more first parameters based on one or more second parameters associated with the large language model, the one or more second parameters having a second fidelity. The memory system may provide the one or more first tokens to the host system.

31 Claims, 9 Drawing Sheets

300

GENERATING TOKENS USING NEAR-MEMORY COMPUTING

GOVERNMENT LICENSE RIGHTS

This invention was made with Government support under Contract DE-AC05-76RL01830 awarded by the U.S. Department of Energy. The Government has certain rights in the invention.

TECHNICAL FIELD

The present disclosure generally relates to memory devices, memory device operations, and, for example, to generating tokens using near-memory computing (NMC).

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
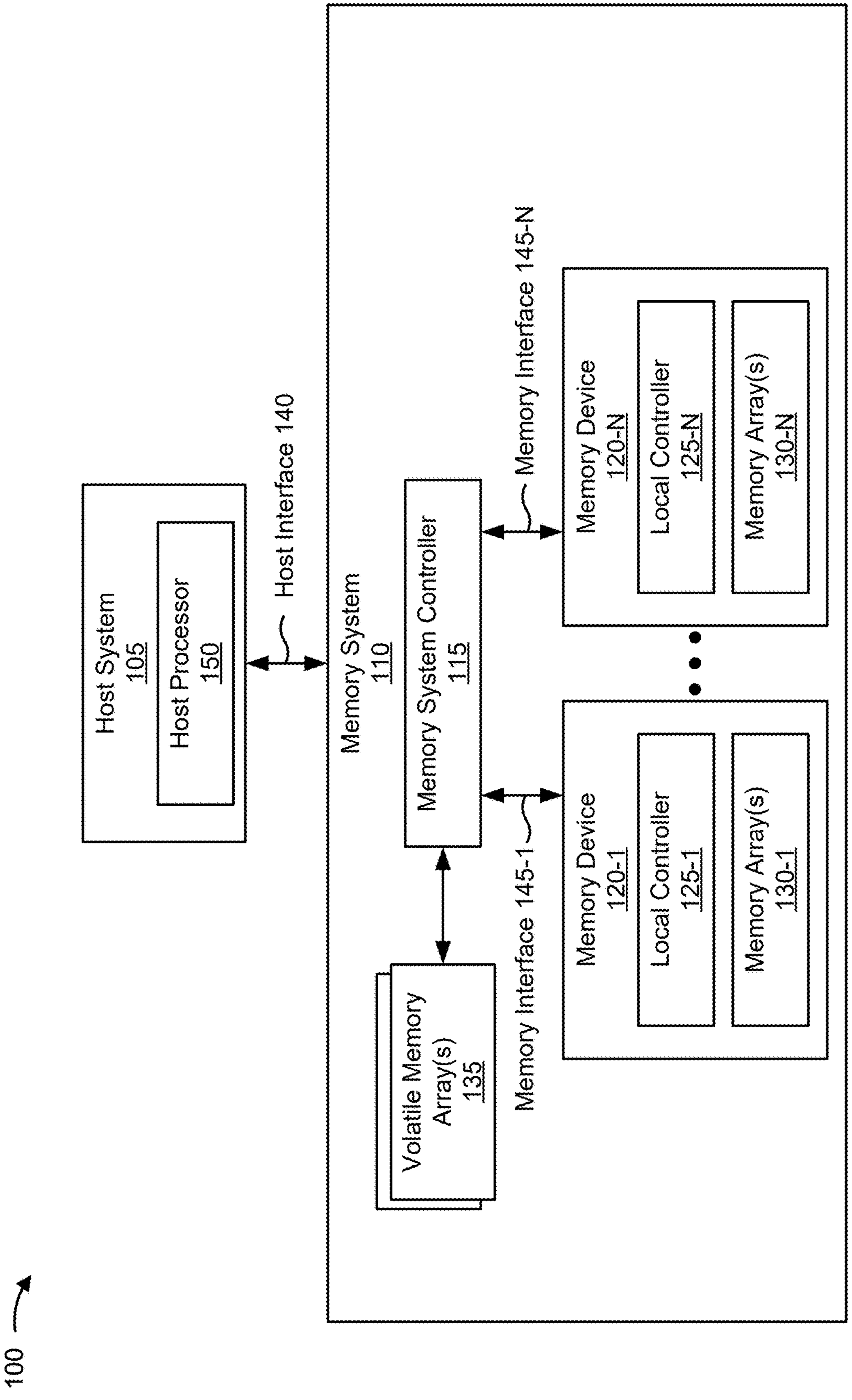
FIG. 1 is a diagram illustrating an example system capable of generating tokens using NMC.

Some computing systems, such as computing systems that operate according to a compute express link (CXL) protocol, may implement a machine learning model, such as a large language model, to process one or more prompts using a set of parameters associated with the machine learning model. For example, a computing system may provide a sequence of input tokens (e.g., an ordered list of input tokens), which may be referred to as a prompt, to a large language model to generate a sequence of output tokens. As described herein, "token" refers to a processing unit, such as one or more words, characters, letters, numbers, images, videos, and/or audio recordings, among other examples, upon which the large language model operates. For example, the computing system may apply the parameters to the prompt by passing the prompt through one or more layers of a neural network associated with the set of parameters to generate a first output token. To generate an $N^{th}$ output token, the computing system may apply the parameters to the prompt and the first output token through an $(N-1)^{th}$ output token. For example, to generate the second output token, the computing system may apply the parameters to the prompt and the first output token (e.g., by concatenating or otherwise combining the prompt and the first output token). Because this process may use previously-generated output tokens (e.g., the first output token) to generate a subsequent output token (e.g., the second output token), the computing system may perform such a process serially. Accordingly, this process may not efficiently use processing resources of a processor of the computing system configured for parallel processing, such as a graphics processing unit (GPU) or other multi-threaded processor.

Some computing systems may use assisted generation to take advantage of parallel processing capabilities of a processor. As described herein, "assisted generation" refers to using a sequence of predicted tokens to generate multiple output tokens in parallel. For example, the computing system may generate the $N^{th}$ output token by applying the parameters to the prompt and the first predicted token through the $(N-1)^{th}$ predicted token, which may allow the computing system to generate all or a subset of the output tokens in parallel. If the computing system determines that the sequence of predicted tokens matches the sequence of output tokens (e.g., by determining that each of the predicted tokens is equal to or otherwise aligns with the corresponding output token), then the computing system may use the output tokens as the result of the prompt. Alternatively, if the sequence of predicted tokens does not match the sequence of output tokens, then the computing system may discard the predicted tokens and generate a corrected sequence of output tokens serially. By using assisted generation, the computing system may improve the performance (e.g., improve the processing speed) of the large language model, for example by more efficiently utilizing the parallel processing capabilities of the processor.

To generate the predicted tokens, the computing system may provide the prompt to one or more assistant models. As described herein, "assistant model" refers to a lower fidelity version of the large language model. For example, an assistant model may include fewer parameters, and thus lower fidelity, than the large language model. Additionally, or alternatively, the parameters of the assistant model may have a lower precision, and thus a lower fidelity, than the parameters of the large language model, as described in greater detail elsewhere herein. Because of the lower fidelity, the computing system may use fewer processing resources to generate the predicted tokens using an assistant model than the processing resources used to generate the output tokens using the large language model. Thus, the computing system thus generate the predicted tokens faster (e.g., with a lower latency) than the output tokens. However, some computing systems may generate the predicted tokens using a processor of a host system, which may consume processing resources of the host system and thus reduce the ability of the host system to perform other functions.

Some implementations described herein enable generating tokens using NMC. For example, a host system may store one or more base parameters associated with a large language model to a memory system. For example, the host system may provide, and the memory system may obtain, a write command indicating that the memory system is to store the base parameters to a location (e.g., an address range) of the memory system. In response to, based on, or otherwise associated with obtaining the write command, the memory system may store the base parameters to the indicated location.

In some examples, the memory system may modify the fidelity of the base parameters, for example by quantizing the base parameters as described in greater detail elsewhere herein, to generate one or more parameters having a lower fidelity than the base parameters. One or more parameters that have a lower fidelity than the base parameters may be referred to as or may be included in an assistant model.

The host system may provide, and the memory system may obtain, a prediction command indicating a prompt (e.g., a sequence of input tokens). The prediction command may indicate that the memory system is to generate a sequence of one or more predicted tokens (e.g., an ordered list of one or more predicted tokens) using the prompt. In some examples, the prediction command may indicate a quantity of predicted tokens that the memory system is to generate. Additionally, the prediction command may indicate a fidelity to be used by the memory system to generate the predicted tokens (e.g., may indicate an assistant model to be used). Based on, in response to, or otherwise associated with obtaining the prediction command, the memory system may generate the predicted tokens using an assistant model of the indicated fidelity.

The memory system may provide, and the host system may obtain, a message indicating the sequence of predicted tokens. Based on, in response to, or otherwise associated with obtaining the predicted tokens, the host system may determine an accuracy of the predicted tokens. For example, the host system may generate a sequence of output tokens using the predicted tokens and the base parameters, as described in greater detail elsewhere herein. In some cases, the host system may provide, and the memory system may obtain, the output tokens.

In some cases, the host system and/or the memory system may compare the output tokens with the predicted tokens to determine whether the output tokens match the predicted tokens. The host system and/or the memory system may adaptively adjust aspects of the assisted generation operations based on the accuracy of the predicted tokens, such as by determining a second fidelity and/or a second quantity of tokens to be predicted for a subsequent iteration of the assisted generation operations.

In some implementations, the memory system may manage a mapping, which may be referred to as a key-value (KV) cache, between one or more tokens and one or more intermediate calculation results associated with the one or more tokens. As described herein, an intermediate calculation result refers to a representation of the token, such as a key matrix and/or a value matrix. As part of generating predicted tokens using a prompt, the memory system may access (e.g., read) the mapping to determine the intermediate calculation result associated with a token in the sequence. If the token is included in the mapping, then the memory system may use the intermediate calculation result associated with the token in the mapping as part of the calculation required to generate the next token (e.g., rather than regenerating the intermediate calculation result). The memory system may add new entries in the mapping table to include an association between the newly generated token and the associated key and value matrices. In some examples, the memory system may store the mapping across the one or more memory devices of the memory system.

As a result, by generating tokens using NMC as described herein, the memory system may improve efficiency of assisted generation for large language models. For example, because the memory system may generate the predicted tokens, rather than the host system, processing load on the host system may be reduced, which may allow, or improve the ability of, the host system to perform other tasks. Additionally, by the host system generating the output tokens using the predicted tokens, the host system may improve the performance (e.g., improve the processing speed) of the large language model, for example by more efficiently utilizing the parallel processing capabilities of the host system. Additionally, by modifying the quantity of predicted tokens and/or the fidelity of assistant models used to generate the predicted tokens after an iteration, the host system and/or the memory system may adaptively improve the performance of assisted generation in subsequent iterations, for example by tuning aspects of the assisted generation to improve the efficient utilization of processing resources of the host system and/or the memory system. Further, by storing the mapping across multiple memory devices of the memory system, the memory system may increase the size of the mapping (e.g., the quantity of associations between tokens and associated key and/or value matrices) that may be stored to the memory system, compared with an example in which the host system stores the mapping. Accordingly, storing the mapping across the memory devices may increase the likelihood of a given token being included in the mapping, which may improve the performance of the assisted generation.

FIG. 1 is a diagram illustrating an example system 100 capable of generating tokens using NMC. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a CPU, a GPU, a field-programmable gate array (FPGA), an application-specific integrated circuit (ASIC), and/or another type of processing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, an eMMC interface, a double data rate (DDR) interface, a DIMM interface, and/or a CXL interface (e.g., a PCIe/CXL interface, described in more detail below).

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

In some examples, the memory system 110 may be a CXL compliant memory system (sometimes referred to herein as a CXL memory system, a CXL memory device, a CXL memory module, a CXL device, and/or a similar term). CXL is a high-speed CPU-to-device and CPU-to-memory interconnect designed to accelerate next-generation performance. CXL technology maintains memory coherency between the CPU memory space and memory on attached devices, which allows resource sharing for higher performance, reduced software stack complexity, and lower overall system cost. CXL is designed to be an industry open standard interface for high-speed communications. CXL technology is built on the PCIe infrastructure, leveraging PCIe physical and electrical interfaces to provide an advanced protocol in areas such as input/output (I/O) protocol, memory protocol, and coherency interface.

In some examples, such as in examples in which the memory system 110 is a CXL device, the memory system 110 may include a PCIe/CXL interface (e.g., the host interface 140 may be associated with a PCIe/CXL interface), which may be a physical interface configured to connect the CXL memory system and/or the CXL memory device to CXL compliant host devices. In such examples, the PCIe/CXL interface may comply with CXL standard specifications for physical connectivity, ensuring broad compatibility and case of integration into existing systems using the CXL protocol. Additionally, or alternatively, a CXL memory system and/or a CXL memory device may be designed to efficiently interface with computing systems (e.g., the host system 105) by leveraging the CXL protocol. For example, a CXL memory system and/or a CXL memory device may be configured to utilize high-speed, low-latency interconnect capabilities of CXL, such as for a purpose of making the CXL memory system and/or the CXL memory device suitable for high-performance computing, data center applications, artificial intelligence (AI) applications, and/or similar applications.

A CXL memory system and/or a CXL memory device may include a CXL memory controller (e.g., memory system controller 115 and/or local controller 125), which may be configured to manage data flow between memory arrays (e.g., volatile memory arrays 135 and/or memory arrays 130) and a CXL interface (e.g., a PCIe/CXL interface, such as host interface 140). In some examples, the CXL memory controller may be configured to handle one or more CXL protocol layers, such as an I/O layer (e.g., a layer associated with a CXL.io protocol, which may be used for purposes such as device discovery, configuration, initialization, I/O virtualization, direct memory access (DMA) using non-coherent load-store semantics, and/or similar purposes); a cache coherency layer (e.g., a layer associated with a CXL-.cache protocol, which may be used for purposes such as caching host memory using a modified, exclusive, shared, invalid (MESI) coherence protocol, or similar purposes); or a memory protocol layer (e.g., a layer associated with a CXL.memory (sometimes referred to as CXL.mem) protocol, which may enable a CXL memory device to expose host-managed device memory (HDM) to permit a host device to manage and access memory similar to a native DDR connected to the host); among other examples.

A CXL memory system and/or a CXL memory device may further include and/or be associated with one or more high-bandwidth memory modules (HBMMs) or similar memory arrays (e.g., volatile memory arrays 135 and/or memory arrays 130). For example, a CXL memory system and/or a CXL memory device may include multiple layers of DRAM (e.g., stacked and/or interconnected through advanced through-silicon via (TSV) technology) in order to maximize storage density and/or enhance data transfer speeds between memory layers. Additionally, or alternatively, a CXL memory system and/or a CXL memory device may include a power management unit, which may be configured to regulate power consumption associated with the CXL memory system and/or the CXL memory device, and/or which may be configured to improve energy efficiency for the CXL memory system and/or the CXL memory device. Additionally, or alternatively, a CXL memory system and/or a CXL memory device may include additional components, such as one or more error correction code (ECC) engines, such as for a purpose of detecting and/or correcting data errors to ensure data integrity and/or improve the overall reliability of the CXL memory system and/or the CXL memory device.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured to: obtain, from a host system, a first command indicating a prompt associated with a large language model; generate, based on the prompt, one or more first tokens using one or more first parameters, the one or more first parameters having a first fidelity and the one or more first parameters based on one or more second parameters associated with the large language model, the one or more second parameters having a second fidelity; and provide the one or more first tokens to the host system.

In some implementations, one or more systems, devices, apparatuses, components, and/or controllers of FIG. 1 may be configured to: obtain, from a host system, a first command indicating one or more input tokens associated with a large language model; generate, based on the one or more input tokens, one or more first tokens using one or more first parameters, the one or more first parameters having a first fidelity; provide, to the host system, the one or more first tokens; obtain, from the host system, a second command indicating one or more second tokens associated with the one or more input tokens; generate, based on the one or more second tokens, one or more third tokens using one or more second parameters, the one or more second parameters having a second fidelity different than the first fidelity; and provide, to the host system, the one or more third tokens.

In some implementations, one or more systems, devices, apparatuses, components, and/or controllers of FIG. 1 may be configured to: provide, to a memory system, a first command indicating a prompt associated with a large language model, the first command further indicating that the memory system is to generate one or more first tokens using one or more first parameters of the large language model, the one or more first parameters having a first fidelity; obtain, from the memory system, the one or more first tokens; generate, using the one or more first tokens and one or more second parameters having a second fidelity, one or more second tokens; and provide a second command indicating the one or more second tokens to the memory system, the second command further indicating that the memory system is to generate one or more third tokens using the one or more second tokens.

In some implementations, one or more systems, devices, apparatuses, components, and/or controllers of FIG. 1 may be configured to: provide, to a memory system, a first command indicating a prompt associated with a large language model, the first command further indicating that the memory system is to generate one or more first tokens using one or more first parameters of the large language model, the one or more first parameters having a first fidelity; obtain, from the memory system, the one or more first tokens; generate, using the one or more first tokens and one or more second parameters having a second fidelity, one or more second tokens; select a third fidelity based on a comparison of the one or more first tokens with the one or more second tokens; and provide a second command indicating the one or more second tokens to the memory system, the second command further indicating that the memory system is to generate one or more third tokens using one or more third parameters having the third fidelity.

In some implementations, one or more systems, devices, apparatuses, components, and/or controllers of FIG. 1 may be configured to: communicate, via an interface and to a memory apparatus, a first command indicating a prompt associated with a large language model, the first command further indicating that the memory apparatus is to generate one or more first tokens using one or more first parameters of the large language model, the one or more first parameters having a first fidelity; communicate, via the interface and to a host system, the one or more first tokens; and communicate, via the interface and to the memory apparatus, a second command indicating one or more second tokens, the second command further indicating that the memory apparatus is to generate one or more third tokens using one or more second parameters of the large language model, the one or more second parameters having a second fidelity.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
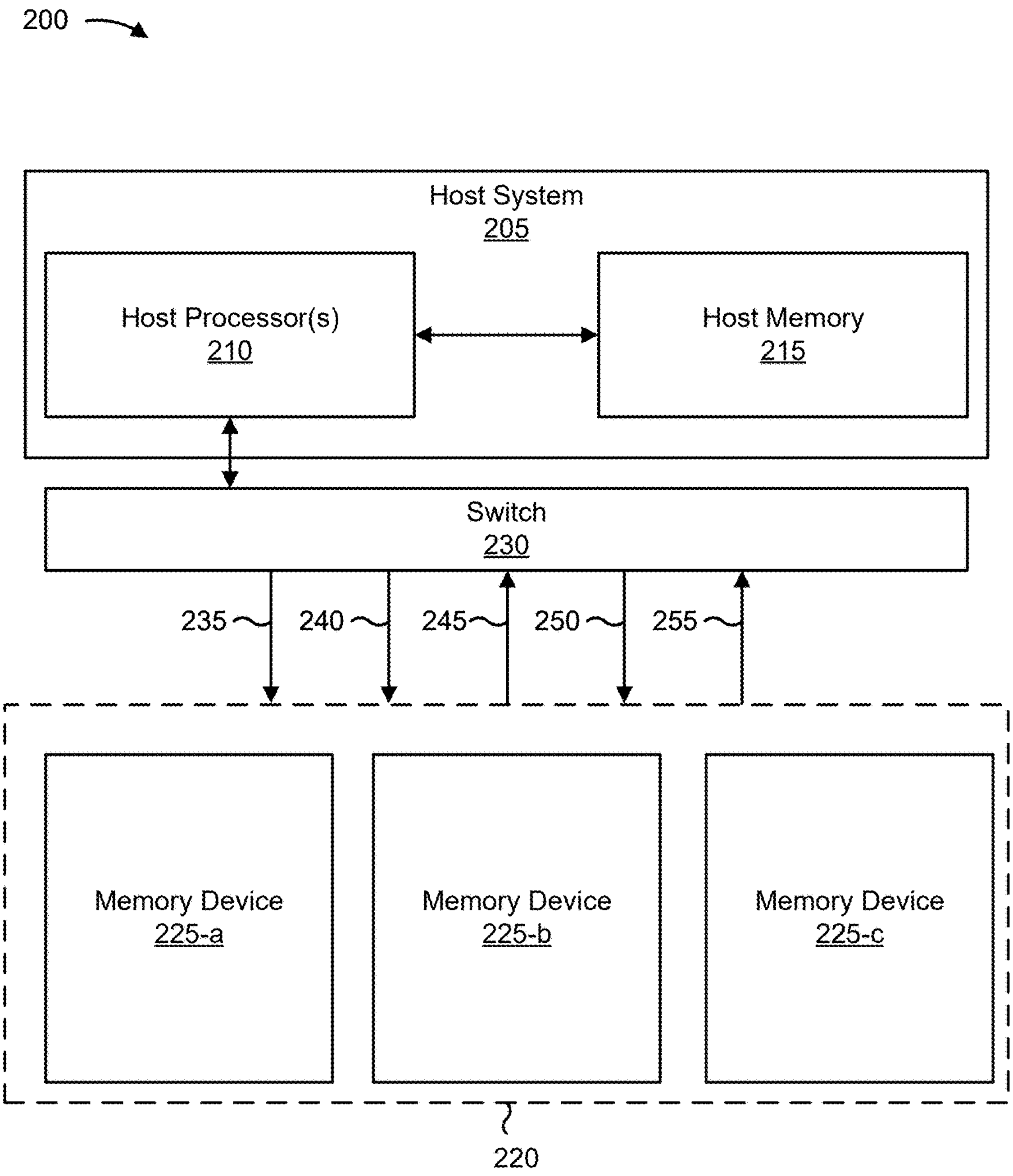
FIG. 2 is a diagram illustrating an example system that supports generating tokens using NMC.

FIG. 2 is a diagram illustrating an example system 200 that supports generating tokens using NMC. The system 200 may include one or more devices, apparatuses, and/or components for performing operations described herein. In some implementations, the system 200 may be a CXL system that communicates in accordance with a PCIe interface. For example, the system 200 may include a host system 205. The host system 205 may include one or more host processors 210, which may be examples of CPUs, GPUs, accelerators, and/or other processing circuitry configured to perform multi-threaded processing. In some examples, the host processor(s) 210 may be separate devices and may communicate according to a CXL protocol. In some examples, the host system 205 may include a host memory 215 coupled to the host processor(s) 210. The host memory 215 may be an example of local or cache memory used by the host processor(s) 210.

The system 200 may further include a shared memory system 220 (e.g., shared among the host processors(s) 210 of the host system 205) that includes one or more memory devices 225, such as a memory device 225-*a*, a memory device 225-*b*, and/or a memory device 225-*c*. In some examples, a memory device 225 may be an example of an NMC device. NMC may be associated with performing one or more processing operations using data via a component that is physically located near a location in which the data is stored. For example, the host processor(s) 210 and the memory device(s) 225 may be located on the same chip, the same SoC, and/or in the same processing system, among other examples. NMC may also be referred to as near-data computing. An NMC device may enable the host system 205 to offload processing tasks to the memory system 220, which may use an NMC device to perform the processing tasks locally before returning associated output data to the host system 205. For example, an NMC device may include one or more processors, such as one or more GPUs, one or more CPUs, and/or one or more accelerators. Because NMC devices may be located physically near the host system 205, signaling between the memory system 220 and the host system 205 may be improved due to relatively short channel length (e.g., physical length of connections between the memory device(s) 225 and the host processor(s) 210). For example, signal interference, signal degradation, and/or power consumption associated with long channels may be reduced.

The system 200 may include an adjustable quantity of host processor(s) 210 and/or memory device(s) 225. For example, host processor(s) 210 and/or memory device(s) 225 may be added to or removed from the system 200 to increase the processing capability of the system 200 (e.g., by including additional processors to increase the memory capacity of the system 200) and/or to increase bandwidth of the system 200 (e.g., by increasing the quantity of interfaces of the system 200).

In some examples, the host system 205 may communicate with the memory system 220 according to a CXL protocol. In some cases, the system 200 may include a switch 230 (e.g., a memory switch, a storage switch) having a set of ports (e.g., channels, interfaces), where each port couples the switch 230 with a respective host processor 210 or memory device 225. The host processor(s) 210 may share data stored to the memory system 220. For example, the host processor (s) 210 and memory device(s) 225 may utilize a common addressing scheme that may allow multiple host processor(s) 210 to access the same data in the memory system 220.

The system 200 may be configured to perform operations associated with a machine learning algorithm, such as a large language model. Although described in the context of a large language model, assisted generation techniques as described herein may be used in other models, such as transformer models, neural network models, or more generally machine learning implementations that include generating output tokens using input tokens. For example, the system 200 may obtain a prompt (e.g., via a user input and/or via one or more messages from a separate system or device) and generate one or more output tokens by applying one or more base parameters to the prompt. To improve the speed at which the output tokens are generated, the system 200 may utilize assisted generation. For example, the memory system 220 may generate one or more predicted tokens using one or more parameters having a lower fidelity than the base parameters. One or more parameters that have a lower fidelity than the base parameters may be referred to as an assistant model. As described herein, the fidelity of a parameter may refer to the precision of the parameter. The precision of a parameter may include the format of the numerical representation of the parameter and/or the quantity of bits used to store the parameter. By way of example, a first parameter having a first fidelity may have a double float format and may be stored using 64 bits. A second parameter having a second fidelity may have single float format and may be stored using 32 bits. Accordingly, the first parameter may have a higher fidelity than the second parameter.

In some cases, the host system 205 may generate the one or more base parameters of the large language model, which may include neural network parameters of the large language model. The host system 205 may generate the base parameters as part of training the large language model, or after training the machine learning model (e.g., by performing post-training quantization). For example, the host system 205 may generate the base parameters by performing one or more training operations associated with the large language model on a set of training data based on a corresponding set of target data. The host system 205 may iteratively apply one or more training parameters to the training data (e.g., in accordance with an architecture of the model, such as by passing the training data through one or more layers of a neural network) and may adjust the training parameters at each iteration to approximate the target data. The base parameters may be the resulting parameters after the one or more training operations. Additionally, or alternatively, the base parameters may correspond to other parameters associated with the large language model, such as pre-trained parameters obtained from a separate system training a large language model. In some examples, the base parameters may be full precision or non-quantized parameters of the large language model. In other examples, the base parameters may be quantized versions of the parameters of the large language model.

In some examples, the host system 205 may store the base parameters to the memory system 220. For example, the host system 205 may provide, and the memory system 220 may obtain, a write command 235 indicating that the memory system 220 is to store the base parameters to a location (e.g., an address range) of the memory system 220. In response to, based on, or otherwise associated with obtaining the write command 235, the memory system 220 may store the base parameters to the indicated location (e.g., in one or more memory devices 225).

In some examples, the memory system 220 may modify the fidelity of the base parameters, for example by quantizing the base parameters, to generate one or more assistant models. As described herein, "quantizing" a parameter refers to modifying the format of the parameter from a higher precision to a lower precision. For example, quantizing a parameter may include applying one or more quantization functions to the parameter to modify the parameter from a first format associated with a first size (e.g., a first quantity of bits) to a second format associated with a second size (e.g., a second quantity of bits) that is less than the first quantity of bits. Such formats may include a double float format (e.g., associated with 64 bits), a single float format (e.g., associated with 32 bits), a brain floating point format (e.g., associated with 16 bits), integer formats (e.g., an integer 8 format (int8) associated with 8 bits, an integer 4 (int4) format associated with 4 bits), and/or ternary encodings (e.g., associated with 1.58 bits), among other examples.

In some examples, the memory system 220 may store multiple versions of the base parameters (e.g., multiple assistant models), each version having a respective fidelity. For example, the host system 205 may indicate, via the write command 235 and/or other commands, that the memory system 220 is to store multiple versions of the base parameters to multiple memory devices 225 (e.g., a respective version to each memory device 225). In such examples, the memory system 220 may generate the multiple versions of the base parameters at least partially in parallel, such as by generating a respective version of the base parameters at one or more of the memory devices 225.

In some cases, the command to write the base parameters may indicate the one or more fidelities for which the memory system 220 is to modify the base parameters. Alternatively, the memory system 220 may modify the base parameters to the one or more fidelities without an explicit instruction from the host system 205, such as by modifying the base parameters to a set of fidelities indicated by a configuration of the memory system 220 (e.g., a configuration stored via metadata of the memory system 220). By generating the assistant models, the memory system 220 may improve performance of the large language model. For example, because the assistant models may have a smaller fidelity compared with the base parameters, the memory system 220 may use fewer processing resources to generate predicted tokens using the assistant models compared with using the base parameters. Further, because the memory system 220 may store multiple assistant models to respective memory devices 225, the memory system 220 may generate multiple streams of predicted tokens concurrently, thus further improving the speed of generating predicted tokens. Moreover, assistant models of increasingly lower latency (e.g. increasing levels of quantization) may be cascaded as assistant models for the next higher fidelity model, further increasing overall performance.

The host system 205 may provide, and the memory system 220 may obtain, a prediction command 240 indicating a prompt. The prediction command 240 may indicate that the memory system 220 is to generate a sequence of predicted tokens (e.g., an ordered list of one or more predicted tokens) using the prompt. In some examples, the prediction command may indicate a quantity of predicted tokens that the memory system 220 is to generate. Additionally, the prediction command 240 may indicate a fidelity to be used by the memory system 220 to generate the predicted tokens (e.g., may indicate an assistant model to be used). For example, the prediction command 240 may indicate a size of the parameters, such as a precision for the parameters and/or a quantity of the parameters, to be used to generate the predicted tokens.

Based on, in response to, or otherwise associated with obtaining the prediction command 240, the memory system 220 may generate the predicted tokens using an assistant model of the indicated fidelity. In some cases, the memory system 220 may read parameters of the assistant model (e.g., from volatile and/or non-volatile memory of the one or more memory devices 225). Alternatively, the memory system 220 may generate the parameters in response to the prediction command 240, for example by applying one or more quantization functions corresponding to the indicated fidelity to the base parameters.

The memory system 220 may generate the predicted tokens by applying the parameters of the assistant model to the prompt (e.g., using respective processors of the one or more memory devices 225). In some cases, the memory system 220 may generate multiple sequences of predicted tokens (e.g., multiple streams of predicted tokens). For example, if the prediction command 240 indicates multiple fidelities, then the memory system 220 may generate a respective sequence of predicted tokens for the multiple fidelities. In such examples, each memory device 225 may generate a respective sequence of predicted tokens (e.g., using a respective processor). Additionally, or alternatively, a single memory device 225 may generate multiple sequences of predicted tokens. The memory system 220 may generate one or more of the sequences of predicted tokens in parallel, such as by multiple memory devices 225 each generating a respective sequence of predicted tokens concurrently, and/or a multi-threaded processor of a memory device 225 generating multiple sequences of predicted tokens concurrently. Additionally, or alternatively, the memory system 220 may generate one or more of the sequences of predicted tokens serially.

The memory system 220 may provide, and the host system 205 may obtain, a message 245 indicating the sequence(s) of predicted tokens. Based on, in response to, or otherwise associated with obtaining the predicted tokens, the host system 205 may determine an accuracy of the predicted tokens. For example, the host system 205 may (e.g., via the host processor(s) 210) generate a sequence of output tokens using the predicted tokens and the base parameters, as described in greater detail elsewhere herein. In some cases, the host system 205 may provide, and the memory system 220 may obtain, the output tokens. By generating the output tokens using the predicted tokens, the host system 205 may improve the performance (e.g., improve the processing speed) of the large language model, for example by more efficiently utilizing the parallel processing capabilities of the host processor(s) 210.

In some cases, the host system 205 and/or the memory system 220 may compare the output tokens with the predicted tokens to determine whether the output tokens match the predicted tokens. For example, if the host system 205 and/or the memory system 220 determines that each of the predicted tokens is equal (e.g., identical) to or otherwise aligns with a corresponding output token, then the host system 205 and/or the memory system 220 may determine that the predicted tokens match the output tokens. Alternatively, if one or more of the predicted tokens is different than (e.g., not equal to, not identical to) a corresponding output token, then the host system 205 and/or the memory system 220 may determine that the predicted tokens and the output tokens do not match. In some examples, the host system 205 and/or the memory system 220 may calculate a score indicating the accuracy of the predicted tokens. The score may indicate the quantity of predicted tokens that match the corresponding output tokens, such as via a ratio between the quantity of predicted tokens that match the corresponding output tokens and the total quantity of predicted tokens.

The system 200 may adaptively adjust aspects of the assisted generation operations based on the accuracy of the predicted tokens, such as by determining a configuration for a subsequent iteration of the assisted generation operations. The system 200 (e.g., the host system 205 and/or the memory system 220) may maintain a table or other data structure associated with the output tokens. The system 200 may record the fidelity associated with generating the predicted tokens (e.g., the precision of parameters used to generate the predicted tokens), the quantity of the predicted tokens, and/or the accuracy of the predicted tokens (e.g., a flag indicating whether the predicted tokens match the output tokens, a score for the predicted tokens) for each iteration. The system 200 may adjust the fidelity and/or the quantity of tokens to be predicted in subsequent iterations based on the table. In some examples, the configuration may indicate the adjusted fidelity and/or the adjusted quantity of tokens to be predicted. For example, if the table indicates that the predicted tokens match the output tokens, then the system 200 may determine whether an amount of processing resources of the host system 205 used to generate the output tokens satisfies a threshold (e.g., whether the host system 205 used a threshold amount of processing resources to generate the output tokens). If the amount of processing resources satisfies the threshold, then the system 200 may determine to reduce the fidelity of the assistant models. Alternatively, if the amount of processing resources does not satisfy the threshold, the system 200 may determine to increase the quantity of predicted tokens to be generated by the memory system 220. By increasing the quantity of predicted tokens for the next iteration, the system 200 may increase the efficiency of assisted generation in the next iteration, for example by providing an increased quantity of predicted tokens to the host processor 210, and thus utilize previously unused processing resources of the host processor 210.

Alternatively, if the accuracy indicates that the predicted tokens do not match the output tokens, then the system 200 may determine whether the quantity of predicted tokens satisfies a threshold (e.g., if the quantity of predicted tokens is greater than one). If the quantity of predicted tokens satisfies the threshold, then the system 200 may decrease (e.g., by a constant, such as by one) the quantity of predicted tokens for the next iteration. Alternatively, if the quantity of predicted tokens does not satisfy the threshold, then the system 200 may increase the fidelity of the assistant models. By decreasing the quantity of predicted tokens and/or increasing the fidelity of the assistant models, the system 200 may improve the accuracy of predicted tokens for the next iteration, and thus improve the efficiency of the assisted generation operations.

The system 200 may iteratively generate predicted tokens using the memory system 220. For example, the host system 205 may provide, and the memory system 220 may obtain, a command 250 indicating that the memory system 220 is to generate an additional sequence of predicted tokens based on the output tokens. The command 250 may indicate the prompt and/or the output tokens. In some examples, the command 250 may indicate one or more modifications for the assisted generation operations (e.g., in accordance with the configuration). For example, the command 250 may indicate a second quantity of predicted tokens to be generated by the memory system 220 and/or a second fidelity for the parameters used to generate predicted tokens. Based on, in response to, or otherwise associated with obtaining the command 250, the memory system may generate a sequence of additional tokens. For example, the memory system 220 may generate the second quantity of predicted tokens using a set of parameters corresponding to the second fidelity. The memory system 220 may provide, and the host system 205 may obtain, a message 255 indicating the additional tokens.

In some implementations, the memory system 220 may manage a mapping, which may be stored to a KV cache, between one or more tokens and one or more intermediate states associated with the large language model. For example, the memory system 220 may store the mapping across the memory device(s) 225. The system 200 (e.g., the host system 205 and/or the memory system 220) may use the mapping to improve the efficiency of generating tokens.

As part of generating the predicted tokens using the prompt, the memory system 220 may access (e.g., read) the mapping to determine whether one or more tokens of the prompt are included in the mapping. If a tokens is included in the mapping, then the memory system may use the token in the mapping as part of the NMC computation of the assistant model to generate the predicted tokens (e.g., rather than generating the key and/or value matrices using one or more parameters). Similarly, the host system 205 may access the mapping as part of generating the output tokens. In some implementations, the memory devices 225 may communicate all or a portion of the mapping. For example, the memory device 225-*b* may communicate all or a portion of the mapping (e.g., via inter-module communication) to the memory device 225-*c*, and the memory device 225-*c* may use the mapping to generate the predicted tokens.

The memory system 220 may update the mapping to include an association between each token (e.g., the one or more input tokens) and their intermediate computation state matrices, which may reduce the amount of computation used to generate the next predicted token. By using the mapping, the system 200 may improve the performance generating tokens based on prompts, for example by reducing the workload on the host system 205 and/or the memory system 220. Further, by storing the mapping across the memory device(s) 225, the system 200 may increase the size of the mapping (e.g., the quantity of associations between prompts and tokens) that may be stored to the system 200, compared with an example in which the system 200 stores the mapping to the host system 205. Accordingly, storing the mapping across the memory device(s) 225 may increase the likelihood of a given token being included in the mapping, which may increase the performance of generating tokens based on prompts.

As indicated above, FIG. 2 is provided as an example. Other examples may differ from what is described with regard to FIG. 2.

Figure 3A:
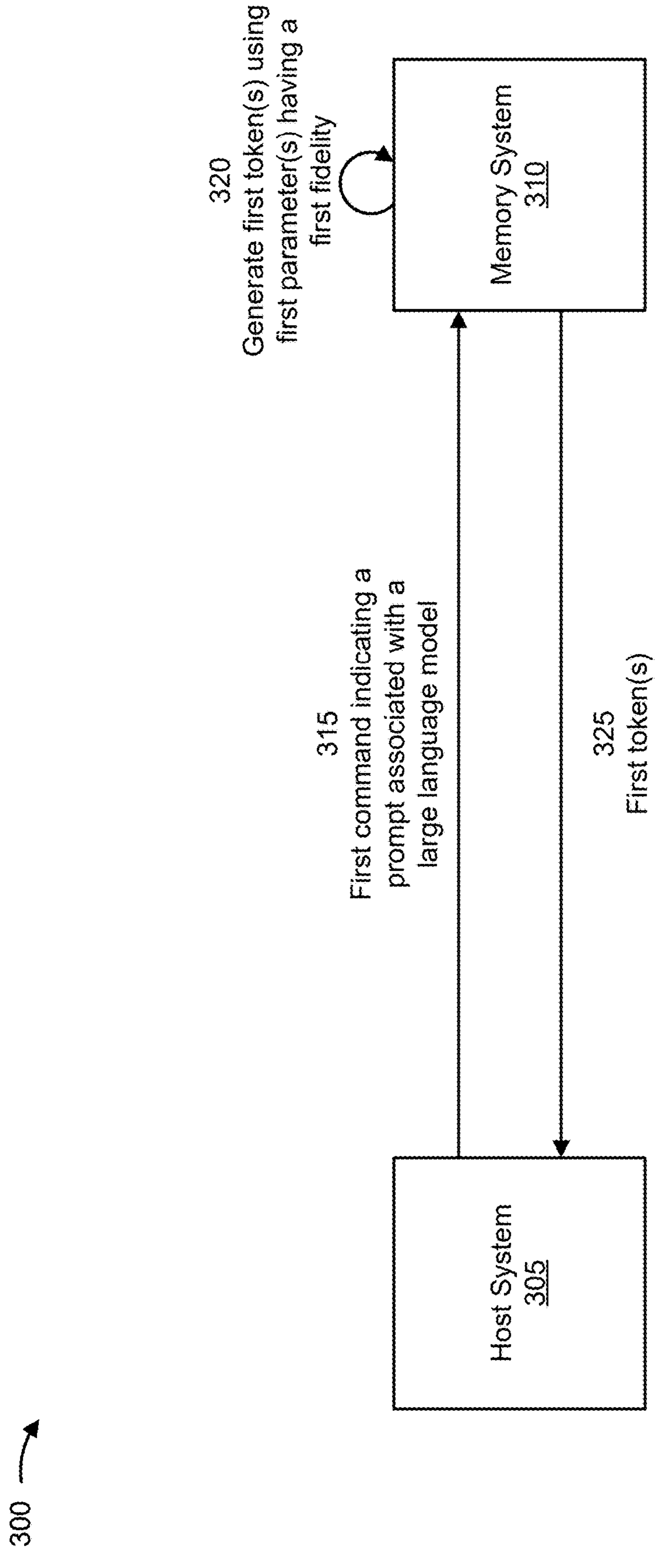
FIGS. 3A and 3B are diagrams of an example of generating tokens using NMC.
Figure 3B:
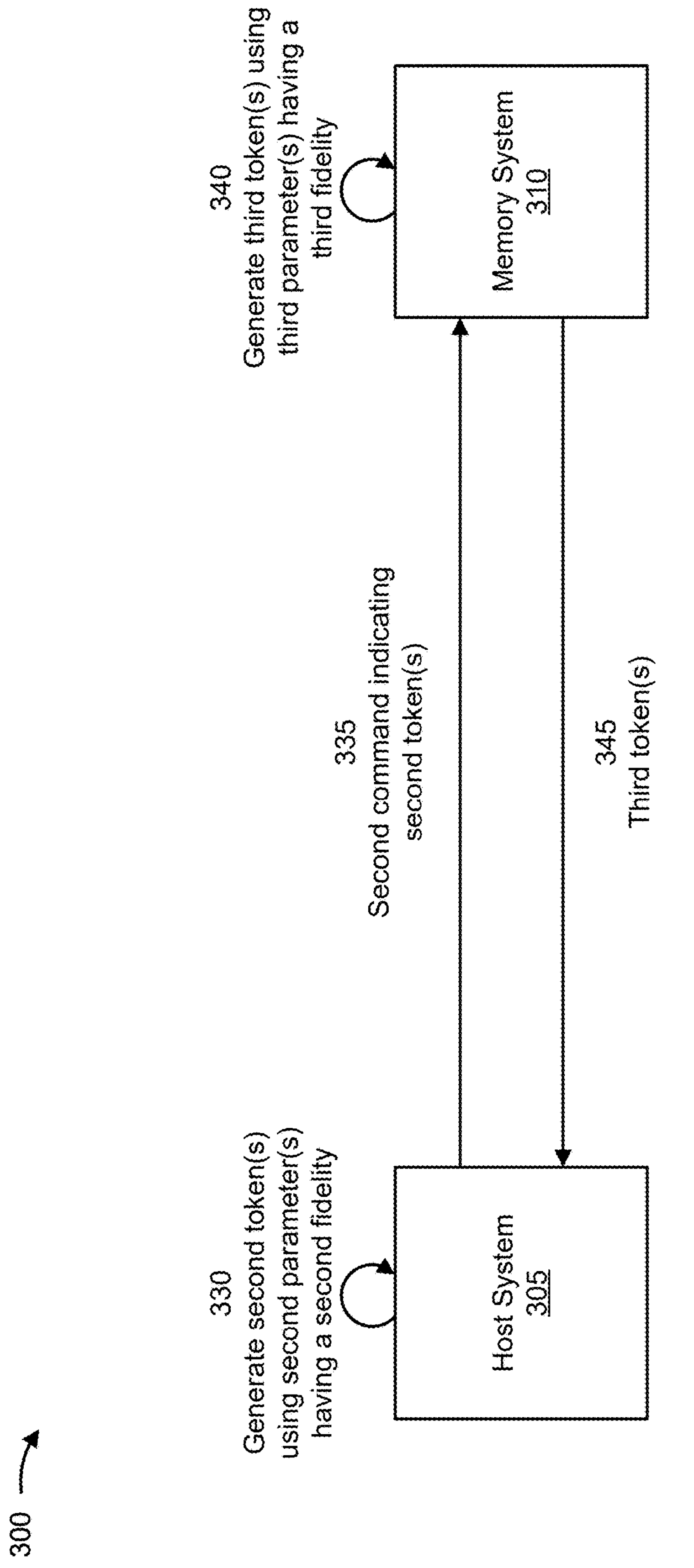

FIGS. 3A and 3B are diagrams of an example 300 of generating tokens using NMC. The operations described in connection with FIGS. 3A and 3B may be performed by one or more components of the memory system 110 and/or the memory system 220, such as the memory system controller 115, one or more memory devices 120, one or more local controllers 125, and/or one or more memory devices 225. Additionally, or alternatively, the operations described in connection with FIGS. 3A and 3B may be performed by the system 100, the host system 105, the host system 205, one or more components of the host system 105 and/or the host system 205 (e.g., the host processor 150, the host processor(s) 210, and/or the host memory 215), the host interface 140, and/or the switch 230.

As shown in FIGS. 3A and 3B, the example 300 may include a host system 305 and a memory system 310. The host system 305 may be an example of the host system 105 and/or the host system 205. The memory system 310 may be an example of the memory system 110 and/or the memory system 220.

As shown in FIG. 3A, and by reference number 315, the host system 305 may provide, and the memory system 310 may obtain, a first command indicating a prompt associated with a large language model. The first command may indicate that the memory system 310 is to generate one or more first tokens (e.g., a sequence of predicted tokens) using one or more first parameters having a first fidelity. In some examples, the first command may indicate a quantity of tokens for the one or more first tokens (e.g., a quantity of tokens that the memory system 310 is to generate). Additionally, the first command may indicate the first fidelity to the memory system 310.

In some examples, the memory system 310 may generate the one or more first parameters based on one or more second parameters having a second fidelity that is higher than the first fidelity (e.g., one or more base parameters of the large language model). For example, the host system 305 may provide, and the memory system 310 may obtain, the one or more second parameters. The memory system 310 may apply one or more quantization functions to the one or more second parameters to generate the one or more first parameters. Alternatively, the host system 305 may generate the one or more first parameters. In such examples, the host system 305 may provide, and the memory system 310 may obtain, the one or more first parameters.

In some examples, the memory system 310 may generate multiple sets of parameters having respective fidelities, such as by generating one or more third parameters having a third fidelity different than the first fidelity and/or different than the second fidelity. For example, the memory system 310 may apply one or more second quantization functions to the one or more second parameters to generate the one or more third parameters. In such examples, the memory system 310 may store respective sets of parameters to one or more memory devices (e.g., memory devices 225) of the memory system 310.

As shown by reference number 320, the memory system 310 may generate the one or more first tokens using the one or more first parameters. In some cases, the memory system 310 may read the one or more first parameters (e.g., from volatile and/or non-volatile memory of the one or more memory devices 225). Alternatively, the memory system 310 may generate the one or more first parameters in response to the first command. The memory system 310 may generate the one or more first tokens by applying the one or more first parameters to the prompt. As shown by reference number 325, the memory system 310 may provide, and the host system 305 may obtain, the one or more first tokens.

As shown in FIG. 3B, and by reference number 330, the host system 305 may generate one or more second tokens (e.g., a sequence of output tokens) using the one or more second parameters and the one or more first tokens. By generating the one or more second tokens using the one or more first tokens, the host system 305 may improve the performance (e.g., improve the processing speed) of the large language model, for example by more efficiently utilizing the parallel processing capabilities of the host system 305.

As shown by reference number 335, the host system 305 may provide, and the memory system 310 may obtain, a second command indicating the one or more second tokens. In some examples, the host system 305 and/or the memory system 310 may determine one or more modifications to the assisted generation operations for one or more subsequent iterations of the assisted generation operations. In such examples, the host system 305 may indicate the one or more modifications using the second command and/or one or more other commands. The one or more modifications may indicate a quantity of one or more third tokens to be generated by the memory system 310 and/or a third fidelity associated with one or more third parameters to be used by the memory system 310 to generate the one or more third tokens. In some examples, the host system 305 may determine the one or more modifications by comparing the one or more first tokens with the one or more second tokens to determine whether the one or more first tokens match the one or more second tokens.

For example, if the one or more first tokens match the one or more second tokens, then the host system 305 and/or the memory system 310 may determine whether an amount of processing resources of the host system 305 used to generate the one or more second tokens satisfies a threshold. If the amount of processing resources satisfies the threshold, then the host system 305 and/or the memory system 310 may determine to reduce the fidelity of the assistant models. Alternatively, if the amount of processing resources does not satisfy the threshold, then the host system 305 and/or the memory system 310 may determine to increase the quantity of tokens to be generated by the memory system 310 as part of a subsequent iteration. By increasing the quantity of tokens for the subsequent iteration, the host system 305 and/or the memory system 310 may increase the efficiency of assisted generation in the next iteration, for example by providing an increased quantity of predicted tokens to the host system 305, and thus utilize previously unused processing resources of the host system 205.

Alternatively, if the one or more first tokens do not match the one or more second tokens, then the host system 305 and/or the memory system 310 may determine whether the quantity of the one or more first tokens satisfies a threshold. If the quantity of the one or more first tokens satisfies the threshold, then the host system 305 and/or the memory system 310 may decrease (e.g., by a constant, such as by one) the quantity of tokens to be generated by the memory system 310 for the subsequent iteration. Alternatively, if the quantity of the one or more first tokens does not satisfy the threshold, then the host system 305 and/or the memory system 310 may determine to increase the fidelity of the assistant models. By decreasing the quantity of tokens to be generated and/or increasing the fidelity of the assistant models, the host system 305 and/or the memory system 310 may improve the accuracy of one or more third tokens generated as part of a subsequent iteration, and thus improve the efficiency of the assisted generation operations.

As shown by reference number 340, the memory system 310 may generate the one or more third tokens using the one or more third parameters having the third fidelity (e.g., as indicated by the second command). The memory system 310 may generate the one or more third tokens using similar operations as described in connection with reference number 320. For examples, the memory system 310 may apply the one or more third parameters to the prompt and/or the one or more second tokens to generate the one or more third tokens. As shown by reference number 345, the memory system 310 may provide, and the host system 305 may obtain, the one or more third tokens.

As indicated above, FIGS. 3A and 3B are provided as examples. Other examples may differ from what is described with regard to FIGS. 3A and 3B.

Figure 4:
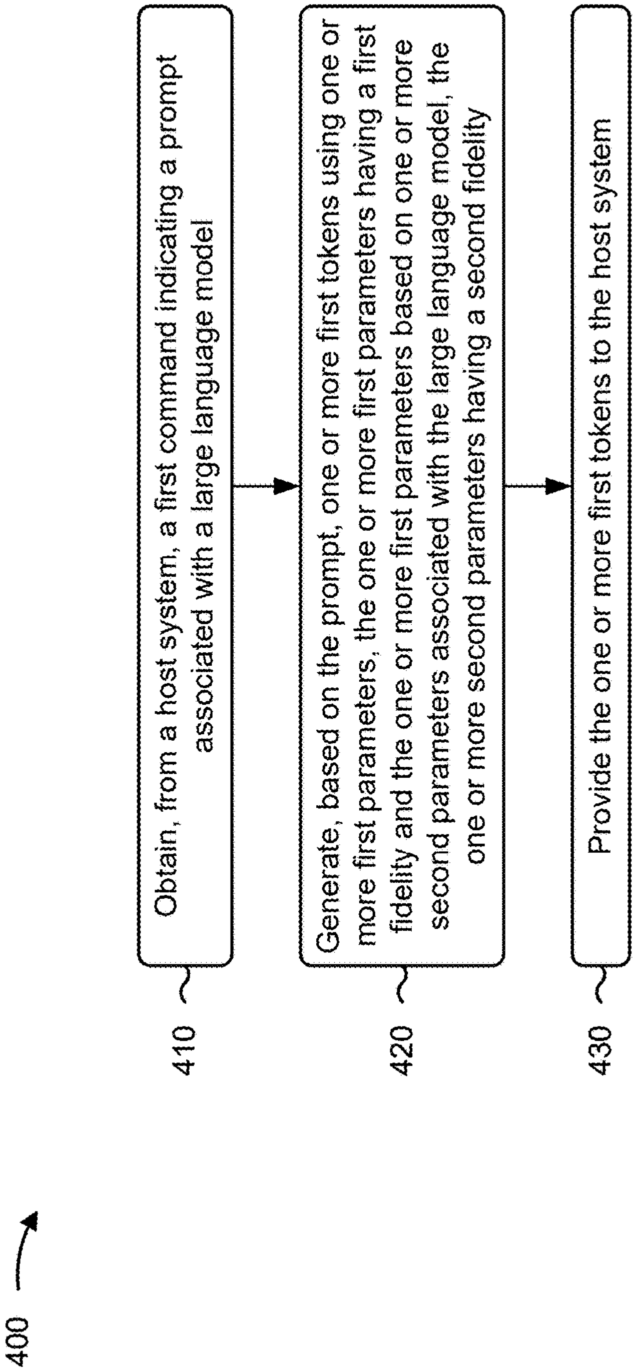
FIG. 4 is a flowchart of an example method associated with generating tokens using NMC.

FIG. 4 is a flowchart of an example method 400 associated with generating tokens using NMC. In some implementations, a memory system (e.g., the memory system 110, the memory system 220 and/or the memory system 310) may perform or may be configured to perform the method 400. In some implementations, another device or a group of devices separate from or including the memory system (e.g., the host system 105, the host system 205, the host system 305, the host processor 150, the host interface 140, the host processor(s) 210, the host memory 215, and/or the switch 230) may perform or may be configured to perform the method 400. Additionally, or alternatively, one or more components of the memory system (e.g., the memory system controller 115, the memory interfaces 145, the memory devices 120, the local controllers 125, the memory arrays 130, and/or the memory devices 225) may perform or may be configured to perform the method 400. Thus, means for performing the method 400 may include the memory system and/or one or more components of the memory system. Additionally, or alternatively, a non-transitory computer-readable medium may store one or more instructions that, when executed by the controller, cause the controller to perform the method 400.

As shown in FIG. 4, the method 400 may include obtaining, from a host system, a first command indicating a prompt associated with a large language model (block 410). As further shown in FIG. 4, the method 400 may include generating, based on the prompt, one or more first tokens using one or more first parameters, the one or more first parameters having a first fidelity and the one or more first parameters based on one or more second parameters associated with the large language model, the one or more second parameters having a second fidelity (block 420). As further shown in FIG. 4, the method 400 may include providing the one or more first tokens to the host system (block 430).

The method 400 may include additional aspects, such as any single aspect or any combination of aspects described below and/or described in connection with one or more other methods or operations described elsewhere herein.

In a first aspect, the method 400 includes obtaining, from the host system, a second command indicating one or more second tokens associated with the prompt, generating, based on the one or more second tokens, one or more third tokens using the one or more first parameters, and providing the one or more third tokens to the host system.

In a second aspect, alone or in combination with the first aspect, the method 400 includes storing, to the one or more memory devices, a mapping between one or more tokens and one or more intermediate calculation results associated with the large language model.

In a third aspect, alone or in combination with one or more of the first and second aspects, the first command indicates a first quantity of tokens for the one or more first tokens and the second command indicates a second quantity of tokens for the one or more second tokens, the first quantity being different than the second quantity.

In a fourth aspect, alone or in combination with one or more of the first through third aspects, the method 400 includes obtaining, from the host system, the one or more first parameters, and storing the one or more first parameters to the one or more memory devices, where generating the one or more first tokens is based on storing the one or more first parameters.

In a fifth aspect, alone or in combination with one or more of the first through fourth aspects, the method 400 includes obtaining, from the host system, the one or more second parameters, generating, based on applying one or more quantization functions to the one or more second parameters, the one or more first parameters, and storing the one or more first parameters to the one or more memory devices, where generating the one or more first tokens is based on storing the one or more first parameters.

In a sixth aspect, alone or in combination with one or more of the first through fifth aspects, the first command indicates a quantity of tokens for the one or more first tokens.

In a seventh aspect, alone or in combination with one or more of the first through sixth aspects, the first command indicates the first fidelity.

In an eighth aspect, alone or in combination with one or more of the first through seventh aspects, the first fidelity corresponds to a first size for a first parameter of the one or more first parameters and the second fidelity corresponds to a second size for a second parameter of the one or more second parameters, the second size being greater than the first size.

In a ninth aspect, alone or in combination with one or more of the first through eighth aspects, the one or more controllers are further configured to cause a first memory device of the one or more memory devices to communicate, to a second memory device of the one or more memory devices, a mapping between one or more tokens and one or more intermediate calculation results associated with the large language model, where generating the one or more first tokens is based on the mapping.

In a tenth aspect, alone or in combination with one or more of the first through ninth aspects, the one or more controllers are one or more near-memory computing (NMC) controllers.

In an eleventh aspect, alone or in combination with one or more of the first through tenth aspects, the one or more first parameters and the one or more second parameters are neural network parameters of the large language model.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein.

Figure 5:
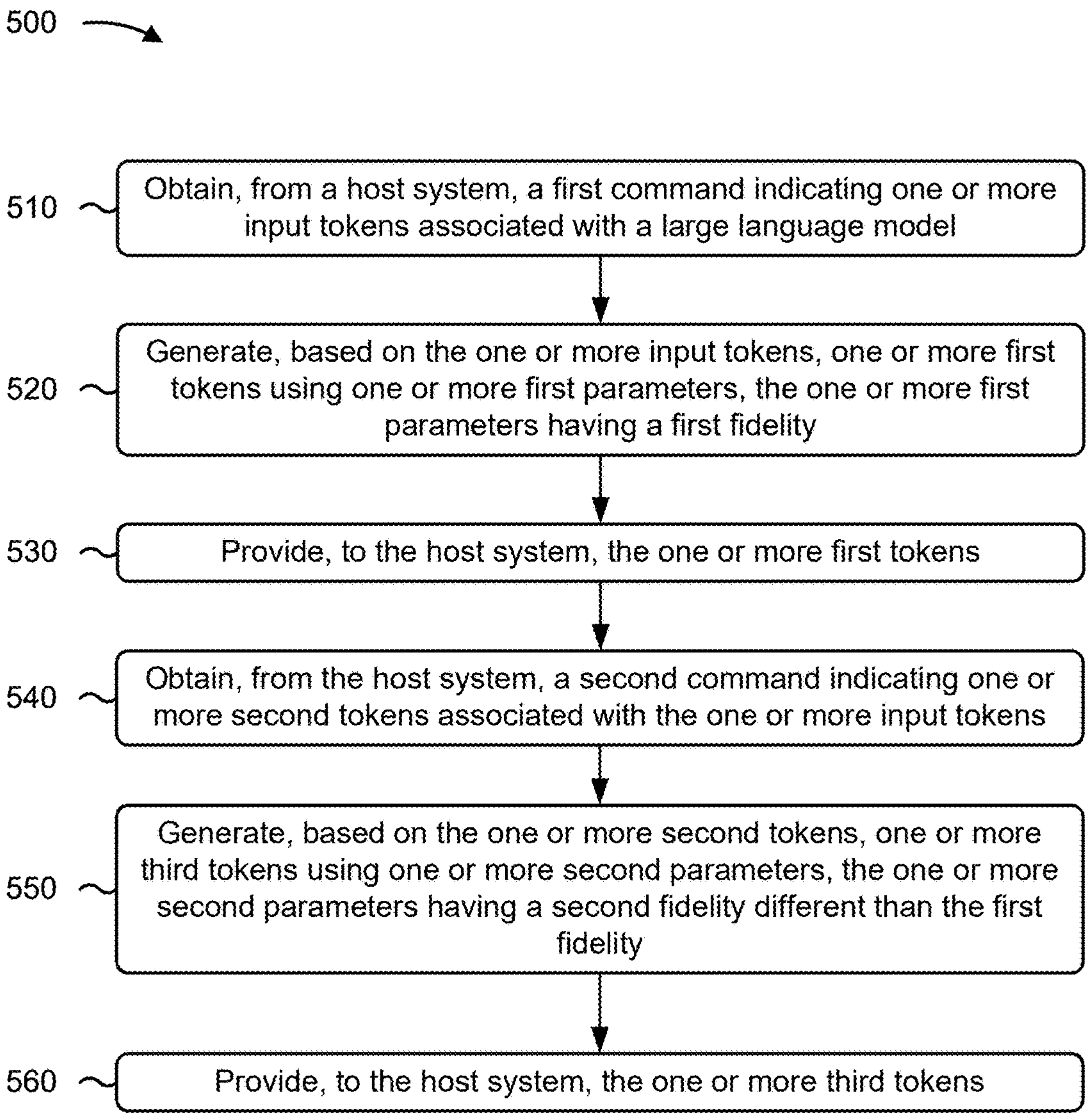
FIG. 5 is a flowchart of an example method associated with generating tokens using NMC.

FIG. 5 is a flowchart of an example method 500 associated with generating tokens using NMC. In some implementations, a memory system (e.g., the memory system 110, the memory system 220 and/or the memory system 310) may perform or may be configured to perform the method 500. In some implementations, another device or a group of devices separate from or including the memory system (e.g., the host system 105, the host system 205, the host system 305, the host processor 150, the host interface 140, the host processor(s) 210, the host memory 215, and/or the switch 230) may perform or may be configured to perform the method 500. Additionally, or alternatively, one or more components of the memory system (e.g., the memory system controller 115, the memory interfaces 145, the memory devices 120, the local controllers 125, the memory arrays 130, and/or the memory devices 225) may perform or may be configured to perform the method 500. Thus, means for performing the method 500 may include the memory system and/or one or more components of the memory system. Additionally, or alternatively, a non-transitory computer-readable medium may store one or more instructions that, when executed by the controller, cause the controller to perform the method 500.

As shown in FIG. 5, the method 500 may include obtaining, from a host system, a first command indicating one or more input tokens associated with a large language model (block 510). As further shown in FIG. 5, the method 500 may include generating, based on the one or more input tokens, one or more first tokens using one or more first parameters, the one or more first parameters having a first fidelity (block 520). As further shown in FIG. 5, the method 500 may include providing to the host system, the one or more first tokens (block 530). As further shown in FIG. 5, the method 500 may include obtaining, from the host system, a second command indicating one or more second tokens associated with the one or more input tokens (block 540). As further shown in FIG. 5, the method 500 may include generating, based on the one or more second tokens, one or more third tokens using one or more second parameters, the one or more second parameters having a second fidelity different than the first fidelity (block 550). As further shown in FIG. 5, the method 500 may include providing to the host system, the one or more third tokens (block 560).

The method 500 may include additional aspects, such as any single aspect or any combination of aspects described below and/or described in connection with one or more other methods or operations described elsewhere herein.

In a first aspect, the method 500 includes obtaining, from the host system, one or more third parameters, generating, based on applying one or more first quantization functions to the one or more third parameters, the one or more first parameters, where generating the one or more first tokens is based on generating the one or more first parameters, and generating, based on applying one or more second quantization functions to the one or more third parameters, the one or more second parameters, where generating the one or more second tokens is based on generating the one or more second parameters.

In a second aspect, alone or in combination with the first aspect, the method 500 includes generating, based on the one or more input tokens and using one or more third parameters having a third fidelity different than the first fidelity, one or more fourth tokens concurrently with generating the one or more first tokens, and providing, to the host system, the one or more fourth tokens.

In a third aspect, alone or in combination with one or more of the first and second aspects, the first command indicates the first fidelity and the second command indicates the second fidelity.

In a fourth aspect, alone or in combination with one or more of the first through third aspects, the method 500 includes selecting the second fidelity based on a comparison of the one or more first tokens with the one or more second tokens.

In a fifth aspect, alone or in combination with one or more of the first through fourth aspects, the first command indicates a first quantity of tokens for the one or more first tokens and the second command indicates a second quantity of tokens for the one or more third tokens, the first quantity being different than the second quantity.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

Figure 6:
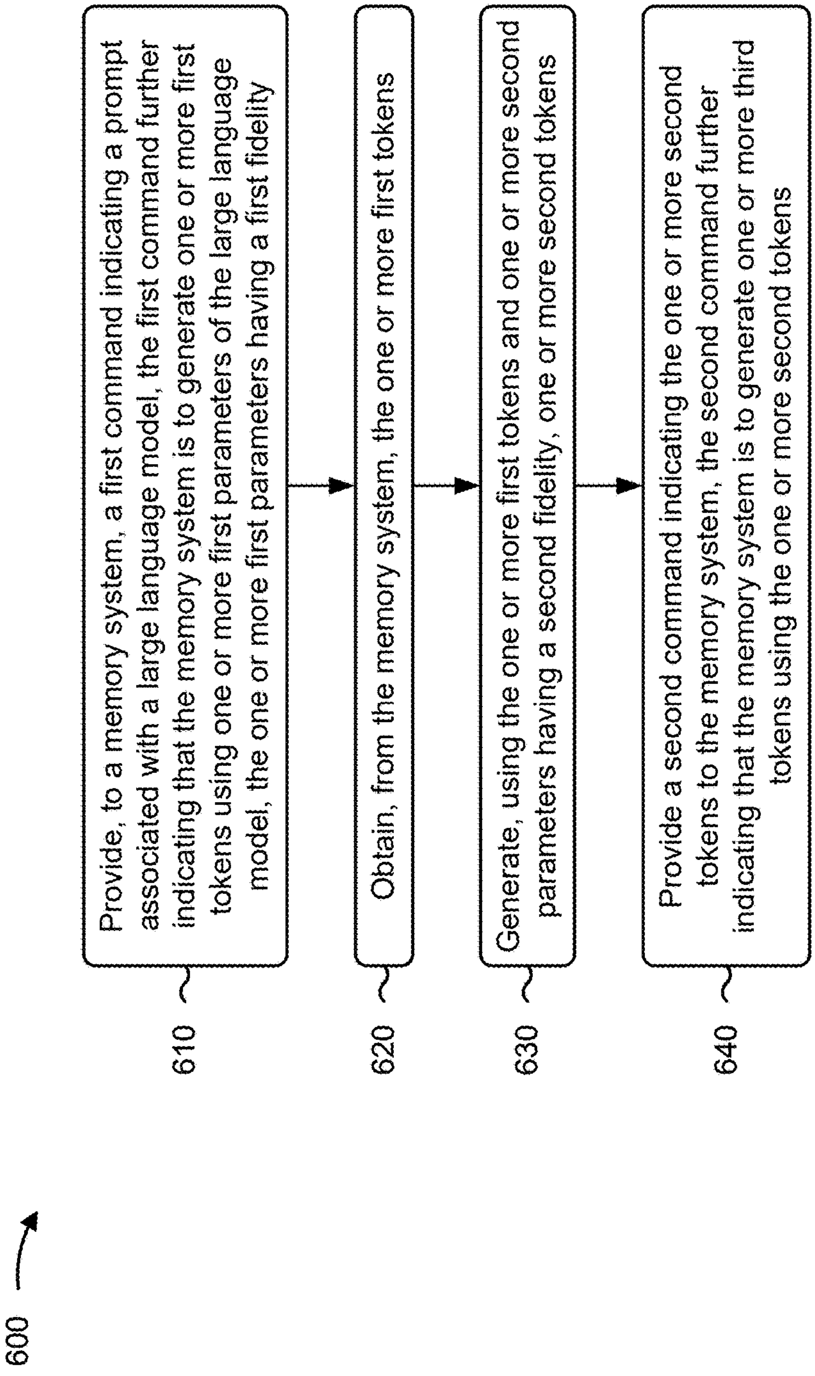
FIG. 6 is a flowchart of an example method associated with generating tokens using NMC.

FIG. 6 is a flowchart of an example method 600 associated with generating tokens using NMC. In some implementations, a host system (e.g., the host system 105, the host system 205, and/or the host system 305) may perform or may be configured to perform the method 600. In some implementations, another device or a group of devices separate from or including the host system (e.g., e.g., the memory system 110, the memory system 220, the memory system 310, the host interface 140, and/or the switch 230) may perform or may be configured to perform the method 600. Additionally, or alternatively, one or more components of the host system (e.g., the host processor 150, the host processor(s) 210, and/or the host memory 215) may perform or may be configured to perform the method 600. Thus, means for performing the method 600 may include the controller and/or one or more components of the controller. Additionally, or alternatively, a non-transitory computer-readable medium may store one or more instructions that, when executed by the controller, cause the controller to perform the method 600.

As shown in FIG. 6, the method 600 may include providing to a memory system, a first command indicating a prompt associated with a large language model, the first command further indicating that the memory system is to generate one or more first tokens using one or more first parameters of the large language model, the one or more first parameters having a first fidelity (block 610). As further shown in FIG. 6, the method 600 may include obtaining, from the memory system, the one or more first tokens (block 620). As further shown in FIG. 6, the method 600 may include generating, using the one or more first tokens and one or more second parameters having a second fidelity, one or more second tokens (block 630). As further shown in FIG. 6, the method 600 may include providing a second command indicating the one or more second tokens to the memory system, the second command further indicating that the memory system is to generate one or more third tokens using the one or more second tokens (block 640).

The method 600 may include additional aspects, such as any single aspect or any combination of aspects described below and/or described in connection with one or more other methods or operations described elsewhere herein.

In a first aspect, the method 600 includes comparing the one or more first tokens with the one or more second tokens, and selecting, based on the comparison of the one or more first tokens with the one or more second tokens, a second quantity of tokens for the one or more third tokens, the second quantity of tokens being different than the first quantity of tokens.

In a second aspect, alone or in combination with the first aspect, the method 600 includes determining, based on the comparison of the one or more first tokens with the one or more second tokens, that the one or more first tokens match the one or more second tokens, and selecting the second quantity to be greater than the first quantity based on determining that the one or more first tokens match the one or more second tokens.

In a third aspect, alone or in combination with one or more of the first and second aspects, the method 600 includes determining, based on the comparison of the one or more first tokens with the one or more second tokens, that the one or more first tokens do not match the one or more second tokens, and selecting the second quantity to be less than the first quantity based on determining that the one or more first tokens do not match the one or more second tokens.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

Figure 7:
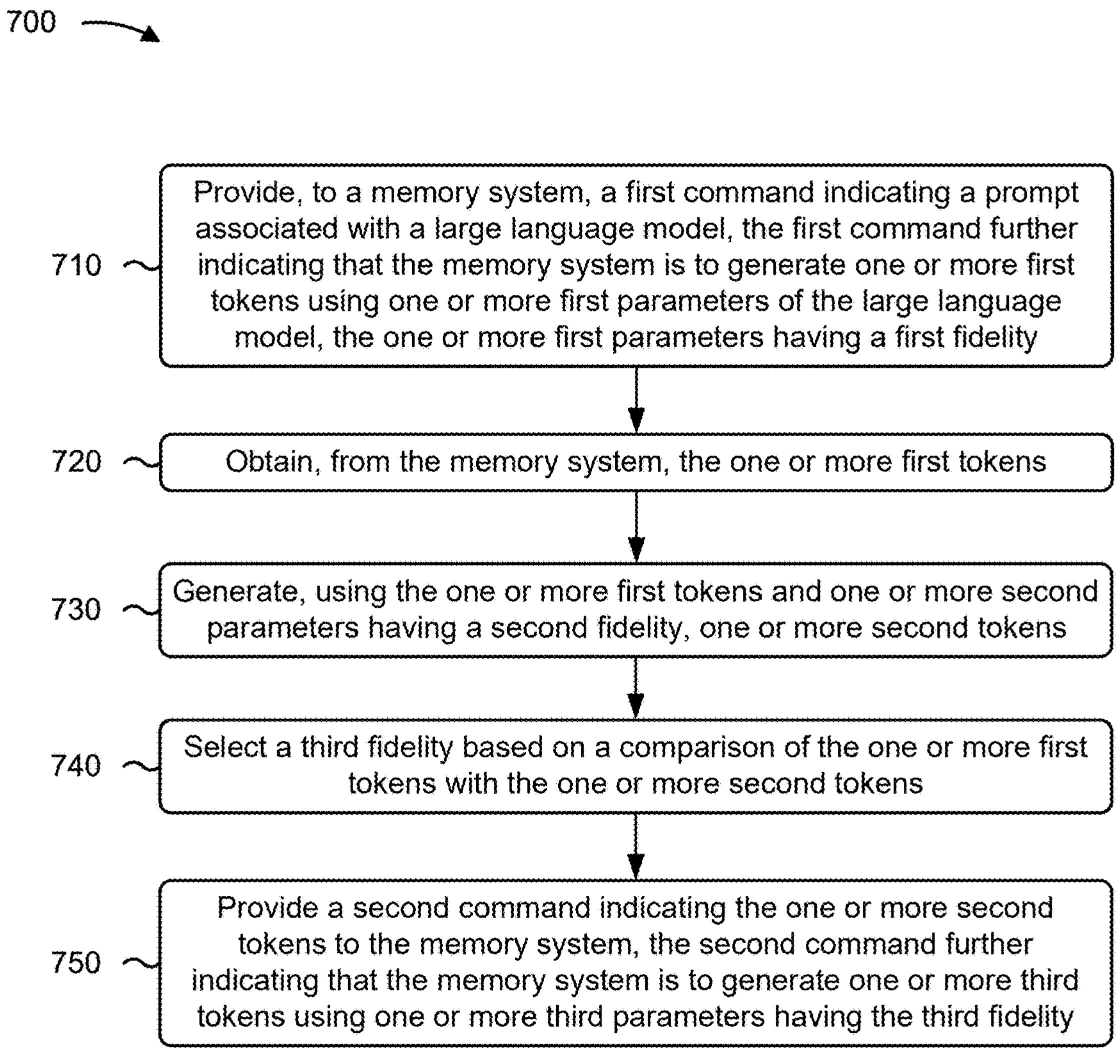
FIG. 7 is a flowchart of an example method associated with generating tokens using NMC.

FIG. 7 is a flowchart of an example method 700 associated with generating tokens using NMC. In some implementations, a host system (e.g., the host system 105, the host system 205, and/or the host system 305) may perform or may be configured to perform the method 700. In some implementations, another device or a group of devices separate from or including the host system (e.g., e.g., the memory system 110, the memory system 220, the memory system 310, the host interface 140, and/or the switch 230) may perform or may be configured to perform the method 700. Additionally, or alternatively, one or more components of the host system (e.g., the host processor 150, the host processor(s) 210, and/or the host memory 215) may perform or may be configured to perform the method 700. Thus, means for performing the method 700 may include the controller and/or one or more components of the controller. Additionally, or alternatively, a non-transitory computer-readable medium may store one or more instructions that, when executed by the controller, cause the controller to perform the method 700.

As shown in FIG. 7, the method 700 may include providing to a memory system, a first command indicating a prompt associated with a large language model, the first command further indicating that the memory system is to generate one or more first tokens using one or more first parameters of the large language model, the one or more first parameters having a first fidelity (block 710). As further shown in FIG. 7, the method 700 may include obtaining, from the memory system, the one or more first tokens (block 720). As further shown in FIG. 7, the method 700 may include generating, using the one or more first tokens and one or more second parameters having a second fidelity, one or more second tokens (block 730). As further shown in FIG. 7, the method 700 may include selecting a third fidelity based on a comparison of the one or more first tokens with the one or more second tokens (block 740). As further shown in FIG. 7, the method 700 may include providing a second command indicating the one or more second tokens to the memory system, the second command further indicating that the memory system is to generate one or more third tokens using one or more third parameters having the third fidelity (block 750).

The method 700 may include additional aspects, such as any single aspect or any combination of aspects described below and/or described in connection with one or more other methods or operations described elsewhere herein.

In a first aspect, the method 700 includes comparing the one or more first tokens with the one or more second tokens, and selecting, based on the comparison of the one or more first tokens with the one or more second tokens, the third fidelity.

In a second aspect, alone or in combination with the first aspect, the method 700 includes determining, based on the comparison of the one or more first tokens with the one or more second tokens, that the one or more first tokens match the one or more second tokens, and selecting the third fidelity to be greater than the first fidelity based on determining that the one or more first tokens match the one or more second tokens.

In a third aspect, alone or in combination with one or more of the first and second aspects, the method 700 includes determining, based on the comparison of the one or more first tokens with the one or more second tokens, that the one or more first tokens do not match the one or more second tokens, and selecting the third fidelity to be less than the first fidelity based on determining that the one or more first tokens do not match the one or more second tokens.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

Figure 8:
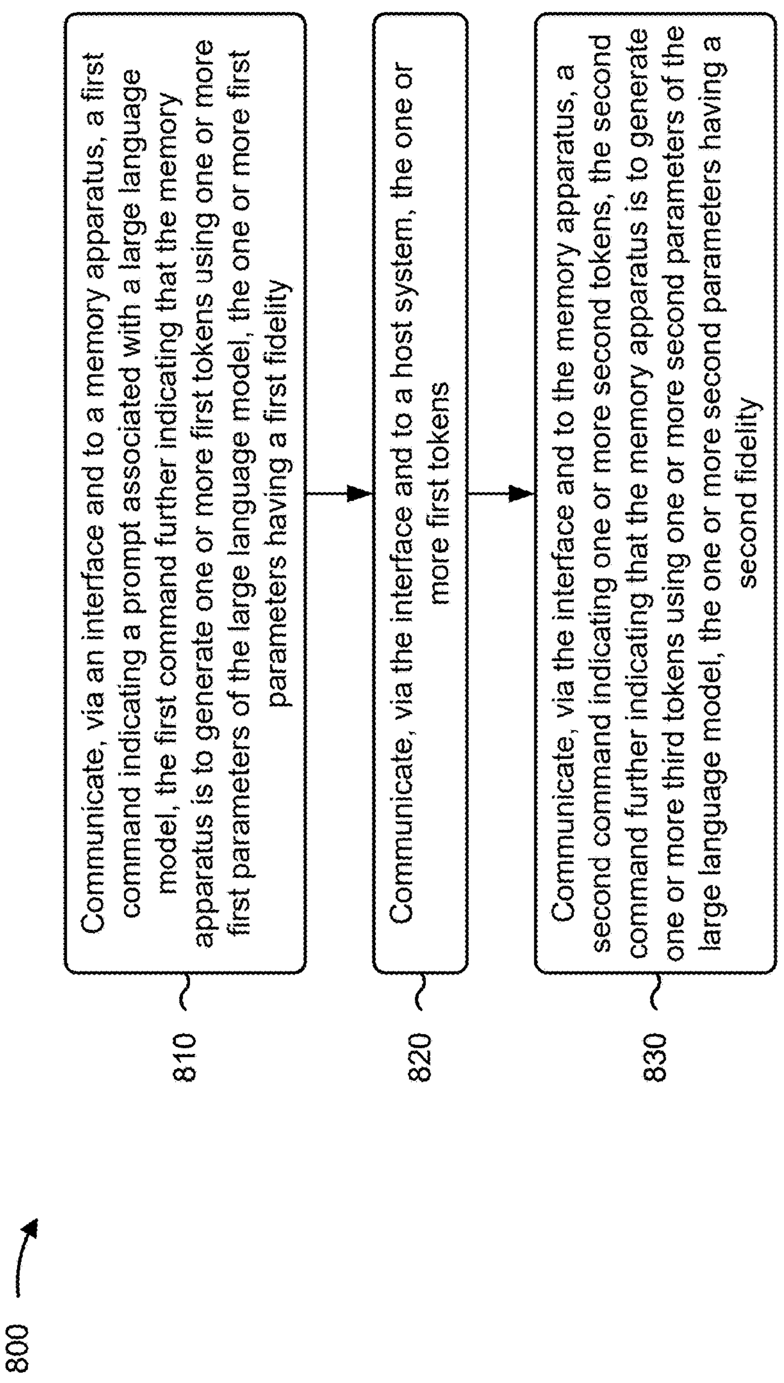
FIG. 8 is a flowchart of an example method associated with generating tokens using NMC.

FIG. 8 is a flowchart of an example method 800 associated with generating tokens using NMC. In some implementations, a system (e.g., the system 100 and/or the system 200) may perform or may be configured to perform the method 800. Additionally, or alternatively, one or more components of the system (e.g., the host system 105, the memory system 110, the host system 205, the memory system 220, the host system 305, and/or the memory system 310) may perform or may be configured to perform the method 800. Thus, means for performing the method 800 may include the controller and/or one or more components of the controller. Additionally, or alternatively, a non-transitory computer-readable medium may store one or more instructions that, when executed by the controller, cause the controller to perform the method 800.

As shown in FIG. 8, the method 800 may include communicating via the interface and to the memory apparatus, a first command indicating a prompt associated with a large language model, the first command further indicating that the memory apparatus is to generate one or more first tokens using one or more first parameters of the large language model, the one or more first parameters having a first fidelity (block 810). As further shown in FIG. 8, the method 800 may include communicating via the interface and to the host system, the one or more first tokens (block 820). As further shown in FIG. 8, the method 800 may include communicating via the interface and to the memory apparatus, a second command indicating one or more second tokens, the second command further indicating that the memory apparatus is to generate one or more third tokens using one or more second parameters of the large language model, the one or more second parameters having a second fidelity (block 830).

The method 800 may include additional aspects, such as any single aspect or any combination of aspects described below and/or described in connection with one or more other methods or operations described elsewhere herein.

In a first aspect, the method 800 includes generating, using the one or more first tokens and one or more third parameters having a third fidelity, the one or more second tokens, where communicating the one or more second tokens is based on generating the one or more second tokens.

In a second aspect, alone or in combination with the first aspect, the method 800 includes comparing the one or more first tokens with the one or more second tokens, and selecting, based on the comparison of the one or more first tokens with the one or more second tokens, the second fidelity.

In a third aspect, alone or in combination with one or more of the first and second aspects, the method 800 includes determining, based on the comparison of the one or more first tokens with the one or more second tokens, that the one or more first tokens match the one or more second tokens, and selecting the second fidelity to be greater than the first fidelity based on determining that the one or more first tokens match the one or more second tokens.

In a fourth aspect, alone or in combination with one or more of the first through third aspects, the method 800 includes determining, based on the comparison of the one or more first tokens with the one or more second tokens, that the one or more first tokens do not match the one or more second tokens, and selecting the second fidelity to be less than the first fidelity based on determining that the one or more first tokens do not match the one or more second tokens.

In a fifth aspect, alone or in combination with one or more of the first through fourth aspects, the interface comprises a switch coupling the host system to the memory apparatus.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

In some implementations, a memory system includes: one or more memory devices; and one or more controllers configured to: obtain, from a host system, a first command indicating a prompt associated with a large language model; generate, based on the prompt, one or more first tokens using one or more first parameters, the one or more first parameters having a first fidelity and the one or more first parameters based on one or more second parameters associated with the large language model, the one or more second parameters having a second fidelity; and provide the one or more first tokens to the host system.

In some implementations, a memory system includes: one or more memory devices; and one or more controllers configured to: obtain, from a host system, a first command indicating one or more input tokens associated with a large language model; generate, based on the one or more input tokens, one or more first tokens using one or more first parameters, the one or more first parameters having a first fidelity; provide, to the host system, the one or more first tokens; obtain, from the host system, a second command indicating one or more second tokens associated with the one or more input tokens; generate, based on the one or more second tokens, one or more third tokens using one or more second parameters, the one or more second parameters having a second fidelity different than the first fidelity; and provide, to the host system, the one or more third tokens.

In some implementations, a host system includes one or more controllers configured to: provide, to a memory system, a first command indicating a prompt associated with a large language model, the first command further indicating that the memory system is to generate one or more first tokens using one or more first parameters of the large language model, the one or more first parameters having a first fidelity; obtain, from the memory system, the one or more first tokens; generate, using the one or more first tokens and one or more second parameters having a second fidelity, one or more second tokens; and provide a second command indicating the one or more second tokens to the memory system, the second command further indicating that the memory system is to generate one or more third tokens using the one or more second tokens.

In some implementations, a host system includes one or more controllers configured to: provide, to a memory system, a first command indicating a prompt associated with a large language model, the first command further indicating that the memory system is to generate one or more first tokens using one or more first parameters of the large language model, the one or more first parameters having a first fidelity; obtain, from the memory system, the one or more first tokens; generate, using the one or more first tokens and one or more second parameters having a second fidelity, one or more second tokens; select a third fidelity based on a comparison of the one or more first tokens with the one or more second tokens; and provide a second command indicating the one or more second tokens to the memory system, the second command further indicating that the memory system is to generate one or more third tokens using one or more third parameters having the third fidelity.

In some implementations, a system includes; a host system; a memory apparatus; an interface between the host system and the memory apparatus; and one or more controllers configured to: communicate, via the interface and to the memory apparatus, a first command indicating a prompt associated with a large language model, the first command further indicating that the memory apparatus is to generate one or more first tokens using one or more first parameters of the large language model, the one or more first parameters having a first fidelity; communicate, via the interface and to the host system, the one or more first tokens; and communicate, via the interface and to the memory apparatus, a second command indicating one or more second tokens, the second command further indicating that the memory apparatus is to generate one or more third tokens using one or more second parameters of the large language model, the one or more second parameters having a second fidelity.

In some implementations, an apparatus includes means for obtaining, from a host system, a first command indicating a prompt associated with a large language model; means for generating, based on the prompt, one or more first tokens using one or more first parameters, the one or more first parameters having a first fidelity and the one or more first parameters based on one or more second parameters associated with the large language model, the one or more second parameters having a second fidelity; and means for providing the one or more first tokens to the host system.

In some implementations, an apparatus includes means for obtaining, from a host system, a first command indicating one or more input tokens associated with a large language model; means for generating, based on the one or more input tokens, one or more first tokens using one or more first parameters, the one or more first parameters having a first fidelity; means for providing, to the host system, the one or more first tokens; means for obtaining, from the host system, a second command indicating one or more second tokens associated with the one or more input tokens; means for generating, based on the one or more second tokens, one or more third tokens using one or more second parameters, the one or more second parameters having a second fidelity different than the first fidelity; and means for providing, to the host system, the one or more third tokens.

In some implementations, an apparatus includes means for providing, to a memory system, a first command indicating a prompt associated with a large language model, the first command further indicating that the memory system is to generate one or more first tokens using one or more first parameters of the large language model, the one or more first parameters having a first fidelity; means for obtaining, from the memory system, the one or more first tokens; means for generating, using the one or more first tokens and one or more second parameters having a second fidelity, one or more second tokens; and means for providing a second command indicating the one or more second tokens to the memory system, the second command further indicating that the memory system is to generate one or more third tokens using the one or more second tokens.

In some implementations, an apparatus includes means for providing, to a memory system, a first command indicating a prompt associated with a large language model, the first command further indicating that the memory system is to generate one or more first tokens using one or more first parameters of the large language model, the one or more first parameters having a first fidelity; means for obtaining, from the memory system, the one or more first tokens; means for generating, using the one or more first tokens and one or more second parameters having a second fidelity, one or more second tokens; means for selecting a third fidelity based on a comparison of the one or more first tokens with the one or more second tokens; and means for providing a second command indicating the one or more second tokens to the memory system, the second command further indicating that the memory system is to generate one or more third tokens using one or more third parameters having the third fidelity.

In some implementations, an apparatus includes means for communicating, via an interface and to a memory apparatus, a first command indicating a prompt associated with a large language model, the first command further indicating that the memory apparatus is to generate one or more first tokens using one or more first parameters of the large language model, the one or more first parameters having a first fidelity; means for communicating, via the interface and to a host system, the one or more first tokens; and means for communicating, via the interface and to the memory apparatus, a second command indicating one or more second tokens, the second command further indicating that the memory apparatus is to generate one or more third tokens using one or more second parameters of the large language model, the one or more second parameters having a second fidelity.

In some implementations, a method includes obtaining, from a host system and by a memory system, a first command indicating a prompt associated with a large language model; generating, by the memory system and based on the prompt, one or more first tokens using one or more first parameters, the one or more first parameters having a first fidelity and the one or more first parameters based on one or more second parameters associated with the large language model, the one or more second parameters having a second fidelity; and providing, by the memory system, the one or more first tokens to the host system.

In some implementations, a method includes obtaining, from a host system and by a memory system, a first command indicating one or more input tokens associated with a large language model; generating, by the memory system and based on the one or more input tokens, one or more first tokens using one or more first parameters, the one or more first parameters having a first fidelity; providing, by the memory system and to the host system, the one or more first tokens; obtaining, by the memory system and from the host system, a second command indicating one or more second tokens associated with the one or more input tokens; generating, by the memory system and based on the one or more second tokens, one or more third tokens using one or more second parameters, the one or more second parameters having a second fidelity different than the first fidelity; and providing, by the memory system and to the host system, the one or more third tokens.

In some implementations, a method includes providing, by a host system and to a memory system, a first command indicating a prompt associated with a large language model, the first command further indicating that the memory system is to generate one or more first tokens using one or more first parameters of the large language model, the one or more first parameters having a first fidelity; obtaining, by the host system and from the memory system, the one or more first tokens; generating, by the host system and using the one or more first tokens and one or more second parameters having a second fidelity, one or more second tokens; and providing, by the host system, a second command indicating the one or more second tokens to the memory system, the second command further indicating that the memory system is to generate one or more third tokens using the one or more second tokens.

In some implementations, a method includes providing, by a host system and to a memory system, a first command indicating a prompt associated with a large language model, the first command further indicating that the memory system is to generate one or more first tokens using one or more first parameters of the large language model, the one or more first parameters having a first fidelity; obtaining, by the host system and from the memory system, the one or more first tokens; generating, by the host system using the one or more first tokens and one or more second parameters having a second fidelity, one or more second tokens; selecting, by the host system, a third fidelity based on a comparison of the one or more first tokens with the one or more second tokens; and providing, by the host system, a second command indicating the one or more second tokens to the memory system, the second command further indicating that the memory system is to generate one or more third tokens using one or more third parameters having the third fidelity.

In some implementations, a method includes communicating, by a system and via an interface and to a memory apparatus, a first command indicating a prompt associated with a large language model, the first command further indicating that the memory apparatus is to generate one or more first tokens using one or more first parameters of the large language model, the one or more first parameters having a first fidelity; communicating, by the system and via the interface and to a host system, the one or more first tokens; and communicating, by the system and via the interface and to the memory apparatus, a second command indicating one or more second tokens, the second command further indicating that the memory apparatus is to generate one or more third tokens using one or more second parameters of the large language model, the one or more second parameters having a second fidelity.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory system, comprising:

one or more memory devices; and one or more near-memory computing (NMC) controllers configured to:

obtain, from a host system, a first command indicating a prompt associated with a large language model;

generate, based on the prompt, one or more first predicted tokens using one or more first parameters stored to the one or more memory devices, the one or more first parameters having a first fidelity, wherein the one or more first parameters are associated with an assistant model based on one or more base parameters associated with the large language model, the one or more base parameters having a second fidelity higher than the first fidelity; and provide the one or more first predicted tokens to the host system.

2. The memory system of claim 1, wherein the one or more NMC controllers are further configured to:

obtain, from the host system, a second command indicating one or more second tokens associated with the prompt;

generate, based on the one or more second tokens, one or more third tokens using the one or more first parameters; and provide the one or more third tokens to the host system.

3. The memory system of claim 2, wherein the one or more NMC controllers are further configured to:

store, to the one or more memory devices, a mapping between one or more tokens and one or more intermediate calculation results associated with the large language model.

4. The memory system of claim 2, wherein the first command indicates a first quantity of tokens for the one or more first predicted tokens and the second command indicates a second quantity of tokens for the one or more second tokens, the first quantity being different than the second quantity.

5. The memory system of claim 1, wherein the one or more NMC controllers are further configured to:

obtain, from the host system, the one or more first parameters; and store the one or more first parameters to the one or more memory devices, wherein generating the one or more first predicted tokens is based on storing the one or more first parameters.

6. The memory system of claim 1, wherein the one or more NMC controllers are further configured to:

obtain, from the host system, the one or more base parameters;

generate, based on applying one or more quantization functions to the one or more base parameters, the one or more first parameters; and store the one or more first parameters to the one or more memory devices, wherein generating the one or more first predicted tokens is based on storing the one or more first parameters.

7. The memory system of claim 1, wherein the first command indicates a quantity of tokens for the one or more first predicted tokens.

8. The memory system of claim 1, wherein the first command indicates the first fidelity.

9. The memory system of claim 1, wherein the first fidelity corresponds to a first size for a first parameter of the one or more first parameters and the second fidelity corresponds to a second size for a second parameter of the one or more base parameters, the second size being greater than the first size.

10. The memory system of claim 1, wherein the one or more NMC controllers are further configured to cause a first memory device of the one or more memory devices to communicate, to a second memory device of the one or more memory devices, a mapping between one or more tokens and one or more intermediate calculation results associated with the large language model, wherein generating the one or more first predicted tokens is based on the mapping.

11. The memory system of claim 1, wherein the one or more first parameters and the one or more base parameters are neural network parameters of the large language model.

12. A memory system, comprising:

one or more memory devices; and one or more near-memory computing (NMC) controllers configured to:

obtain, from a host system, a first command indicating one or more input tokens associated with a large language model;

generate, based on the one or more input tokens, one or more first predicted tokens using one or more first parameters stored to the one or more memory devices, the one or more first parameters having a first fidelity, wherein the one or more first parameters are associated with an assistant model of the large language model;

provide, to the host system, the one or more first predicted tokens;

obtain, from the host system, a second command indicating one or more second tokens associated with the one or more input tokens;

generate, based on the one or more second tokens, one or more third predicted tokens using one or more second parameters, the one or more second parameters having a second fidelity different than the first fidelity; and provide, to the host system, the one or more third predicted tokens.

13. The memory system of claim 12, wherein the one or more NMC controllers are further configured to:

obtain, from the host system, one or more third parameters;

generate, based on applying one or more first quantization functions to the one or more third parameters, the one or more first parameters, wherein generating the one or more first tokens is based on generating the one or more first parameters; and generate, based on applying one or more second quantization functions to the one or more third parameters, the one or more second parameters, wherein generating the one or more third predicted tokens is based on generating the one or more second parameters.

14. The memory system of claim 12, wherein the one or more NMC controllers are further configured to:

generate, based on the one or more input tokens and using one or more third parameters having a third fidelity different than the first fidelity, one or more fourth tokens concurrently with generating the one or more first predicted tokens; and provide, to the host system, the one or more fourth tokens.

15. The memory system of claim 12, wherein the first command indicates the first fidelity and the second command indicates the second fidelity.

16. The memory system of claim 12, wherein the one or more NMC controllers are further configured to:

select the second fidelity based on a comparison of the one or more first predicted tokens with the one or more second tokens.

17. The memory system of claim 12, wherein the first command indicates a first quantity of tokens for the one or more first predicted tokens and the second command indicates a second quantity of tokens for the one or more third predicted tokens, the first quantity being different than the second quantity.

18. A host system, comprising:

one or more controllers configured to:

provide, to a memory system, a first command indicating a prompt associated with a large language model, the first command further indicating that the memory system is to generate one or more first predicted tokens using one or more first parameters of the large language model, the one or more first parameters having a first fidelity and the one or more first parameters stored to the memory system, wherein the one or more first parameters are associated with an assistant model of the large language model;

obtain, from the memory system, the one or more first predicted tokens;

generate, using the one or more first predicted tokens and one or more base parameters having a second fidelity, one or more second tokens; and provide a second command indicating the one or more second tokens to the memory system, the second command further indicating that the memory system is to generate one or more third predicted tokens using the one or more second tokens.

19. The host system of claim 18, wherein the one or more first predicted tokens comprise a first quantity of tokens, and wherein the one or more controllers are further configured to:

compare the one or more first predicted tokens with the one or more second tokens; and select, based on the comparison of the one or more first predicted tokens with the one or more second tokens, a second quantity of tokens for the one or more third predicted tokens, the second quantity of tokens being different than the first quantity of tokens.

20. The host system of claim 19, wherein, to select the second quantity of tokens, the one or more controllers are configured to:

determine, based on the comparison of the one or more first predicted tokens with the one or more second tokens, that the one or more first predicted tokens match the one or more second tokens; and select the second quantity to be greater than the first quantity based on determining that the one or more first predicted tokens match the one or more second tokens.

21. The host system of claim 19, wherein, to select the second quantity of tokens, the one or more controllers are configured to:

determine, based on the comparison of the one or more first predicted tokens with the one or more second tokens, that the one or more first predicted tokens do not match the one or more second tokens; and select the second quantity to be less than the first quantity based on determining that the one or more first predicted tokens do not match the one or more second tokens.

22. A host system, comprising:

one or more controllers configured to:

provide, to a memory system, a first command indicating a prompt associated with a large language model, the first command further indicating that the memory system is to generate one or more first predicted tokens using one or more first parameters of the large language model, the one or more first parameters having a first fidelity and the one or more first parameters stored to the memory system, wherein the one or more first parameters are associated with an assistant model of the large language model;

obtain, from the memory system, the one or more predicted first tokens;

generate, using the one or more first predicted tokens and one or more base parameters having a second fidelity, one or more second tokens;

select a third fidelity based on a comparison of the one or more first predicted tokens with the one or more second tokens; and provide a second command indicating the one or more second tokens to the memory system, the second command further indicating that the memory system is to generate one or more third predicted tokens using one or more third parameters having the third fidelity.

23. The host system of claim 22, wherein the one or more controllers are further configured to:

compare the one or more first predicted tokens with the one or more second tokens; and select, based on the comparison of the one or more first predicted tokens with the one or more second tokens, the third fidelity.

24. The host system of claim 23, wherein, to select the third fidelity, the one or more controllers are configured to:

determine, based on the comparison of the one or more first predicted tokens with the one or more second tokens, that the one or more first predicted tokens match the one or more second tokens; and select the third fidelity to be greater than the first fidelity based on determining that the one or more first predicted tokens match the one or more second tokens.

25. The host system of claim 23, wherein, to select the third fidelity, the one or more controllers are configured to:

determine, based on the comparison of the one or more first predicted tokens with the one or more second tokens, that the one or more first predicted tokens do not match the one or more second tokens; and select the third fidelity to be less than the first fidelity based on determining that the one or more first predicted tokens do not match the one or more second tokens.

26. A system, comprising;

a host system;

a memory apparatus;

an interface between the host system and the memory apparatus; and one or more controllers configured to:

communicate, via the interface and to the memory apparatus, a first command indicating a prompt associated with a large language model, the first command further indicating that the memory apparatus is to generate one or more first predicted tokens using one or more first parameters of the large language model, the one or more first parameters having a first fidelity and the one or more first parameters stored to the memory apparatus, wherein the one or more first parameters are associated with an assistant model of the large language model;

communicate, via the interface and to the host system, the one or more first predicted tokens; and communicate, via the interface and to the memory apparatus, a second command indicating one or more second tokens, the second command further indicating that the memory apparatus is to generate one or more third predicted tokens using one or more second parameters of the large language model, the one or more second parameters having a second fidelity.

27. The system of claim 26, wherein the host system is configured to:

generate, using the one or more first predicted tokens and one or more third parameters having a third fidelity, the one or more second tokens, wherein communicating the one or more second tokens is based on generating the one or more second tokens.

28. The system of claim 26, wherein the one or more controllers are further configured to:

compare the one or more first predicted tokens with the one or more second tokens; and select, based on the comparison of the one or more first predicted tokens with the one or more second tokens, the second fidelity.

29. The system of claim 28, wherein, to select the second fidelity, the one or more controllers are configured to:

determine, based on the comparison of the one or more first predicted tokens with the one or more second tokens, that the one or more first predicted tokens match the one or more second tokens; and select the second fidelity to be greater than the first fidelity based on determining that the one or more first predicted tokens match the one or more second tokens.

30. The system of claim 28, wherein, to select the second fidelity, the one or more controllers are configured to:

determine, based on the comparison of the one or more first predicted tokens with the one or more second tokens, that the one or more first predicted tokens do not match the one or more second tokens; and select the second fidelity to be less than the first fidelity based on determining that the one or more first predicted tokens do not match the one or more second tokens.

31. The system of claim 26, wherein the interface comprises a switch coupling the host system to the memory apparatus.

* * * * *